United States Patent [19]
Wehde

[11] 4,026,092
[45] May 31, 1977

[54] ROW CROP HARVESTING APPARATUS

[76] Inventor: James F. Wehde, Garretson, S. Dak. 57030

[22] Filed: Dec. 12, 1975

[21] Appl. No.: 640,339

[52] U.S. Cl. .................................. 56/14.3; 171/58
[51] Int. Cl.² ........................................ A01D 45/02
[58] Field of Search ................ 56/14.2, 14.3, 119, 56/51–66, 94–112, 119, 121.4–121.46; 171/58, 61

[56] References Cited
UNITED STATES PATENTS

| 969,817 | 9/1910 | Weathern | 56/295 |
|---|---|---|---|
| 3,716,974 | 2/1973 | Wehde | 56/14.3 |
| 3,769,782 | 11/1973 | Cler | 56/51 |

Primary Examiner—Russell R. Kinsey
Attorney, Agent, or Firm—Williamson, Bains & Moore

[57] ABSTRACT

Apparatus for harvesting row crops utilizing forwardly inclined gripping wheels mounted on the receiving end of a harvesting machine to lift crop stalks out of the ground and hold them for severing by a cutting blade. A low level drive shaft below the gripping wheels drives them through power transmitting means positioned completely below the wheels.

Baffle members behind and under each pair of gripping wheels prevent harvesting crop materials being conveyed laterally on a harvesting machine receiving platform from being caught by the revolving pickup wheels and thrown back on the ground. Flexible, brush skirts depending from the stalk gripping wheels assist in moving crop materials rearwardly of the wheels onto a receiving platform.

25 Claims, 6 Drawing Figures

ROW CROP HARVESTING APPARATUS

BACKGROUND OF THE INVENTION

In my previously issued U.S. Pat. No. 3,716,974 entitled, "HARVESTING ATTACHMENT FOR COMBINES", a stalk engaging and lifting structure is disclosed which is particularly effective to cope with the problem of harvesting low lying crops, such as, soybeans. That apparatus utilizes pairs of inclined gripping wheels having a crop gripping area between them so disposed as to lift stalks out of the group a predetermined height which will ensure that low lying pods or fruit bearing leaves will be harvested. This is accomplished by utilizing the rotating gripping wheels to lift crop stalks to a predetermined height where the lowest pods will be above the combine cutting blade and thus severed from the plant roots while still being held by the gripping wheels. The gripping wheels then convey the severed stalks rearwardly onto a receiving platform for lateral movement by an auger or other conveying device. In addition to the prior art patents cited in the above noted patent, U.S. Pat. No. 2,949,716 issued to E. Thomson on Aug. 23, 1960 is directed to a harvesting machine for row crops utilizing pairs of flexible, rotary cylinders to engage crops stalks. However, the long, high rotary pickup cylinders of Thomson would not be effective to engage and lift low lying vine crops such as soy beans. Also, interlocked vines and stalks of certain kinds of row crops, notably soybeans, would become caught and entangled on the exposed, elevated gripping cylinders disclosed by Thomson and on the overhead support apparatus for these cylinders.

A further problem encountered on crop harvesters of the type disclosed in the aforesaid patents is that the harvested crop stalks are sometimes caught by the revolving pickup wheels or other rotating pickup devices as the stalks are being conveyed transversely of a receiving platform by an auger or other conveyor means. As a result, the crop product is carried back off of the receiving platform and thrown on the ground. In addition to the undesirable crop loss, this problem also causes the rotating pickup members to become entangled with crop stalks and vines.

The harvesting apparatus disclosed herein represents an improvement in the gripping wheel crop harvester of my U.S. Pat. No. 3,716,974. In particular, the aforesaid problems are overcome by an improved arrangement of mounting and drive means for rotary, crop gripping members and by the use of shields and baffles in a particularly effective way in conjunction therewith.

BRIEF SUMMARY OF THE INVENTION

The improved crop harvesting apparatus of this invention is utilized in conjunction with one or more pairs of forwardly inclined, crop gripping wheels in such a way as to provide a low profile, pickup assembly for crops lying close to the ground on which crop stalks and vines will not become entangled, either during the initial crop pickup or in the course of lateral conveyance of harvested crops on a receiving platform.

These basic objects and advantages are realized by supporting at least one pair of downwardly and forwardly inclined rotary gripping wheels close to the ground on base plate means in such a way that both the support and drive means for the stalk gripping wheels are disposed below the wheels, thereby avoiding any overhead support or drive components on which crop vines or stalks could become caught and entangled. A low level drive shaft extending transversely of a harvesting machine receiving platform upon which the gripping wheels are mounted is preferably positioned below the forward end of the receiving platform, and power transmitting means extend between this drive shaft and the axle of one or more rotary gripping wheels, with the power takeoff means being positioned in its entirety below the rotary gripping wheels.

The aforesaid rotary gripping wheels have yieldable, peripheral surfaces in pressure contact with each other along a contact and gripping area extending from a point forwardly of the cutting zone of a cutting blade at the forward end of a receiving platform rearwardly to a point at least as far rearwardly as the rear end of the cutting zone in overlying relation thereto. With the cutting blade taking the form of an elongated sickle laterally reciprocal in a direction transverse to the direction of movement of a harvesting machine, the aforesaid low level drive shaft is preferably positioned below the platform behind the cutting blade at substantially the same level therewith. The positioning of the drive shaft below the receiving platform ensures that it will not interfere in any way with the rearward movement of crop product by the pickup wheels onto the receiving platform.

As a particularly beneficial feature of my improved harvesting apparatus, an upwardly extending baffle plate is provided adjacent the forward end of the receiving platform of a harvesting machine and projects upwardly to a position in close proximity to the underside of the rotary gripping wheels. The aforesaid power transmitting means from the low level drive shaft is located forwardly of this baffle plate, thereby ensuring that the crop product, weeds and trash are not caught on the power transmitting apparatus.

As a further beneficial aspect of my improved harvesting attachment, I provide a guide baffle extending downwardly behind the aforesaid rotary gripping wheels in closely spaced relation thereto. The guide baffle terminates below the gripping wheels and serves to prevent crop product being moved laterally of a receiving platform by conveyor means from being caught on the rotary gripping wheels and carried around off of the platform. This upper guide baffle is spaced rearwardly from the aforesaid baffle plate extending upardly from the front end of the platform under the rotary gripping wheels and advantageously cooperates therewith to provide a guide passage through which crop stalks carried around by the gripping wheels will fall for reception on the receiving platform. The aforesaid upper guide baffle is preferably part of an overhead shield assembly which includes a forwardly extending top cover positioned over the gripping wheels in closely spaced, substantially parallel relation thereto.

The harvesting attachment further preferably includes a brushlike, flexible skirt affixed to the lower peripheral surface of each of the rotary gripping wheels for rotation therewith. These skirts flare outwardly and overlap at their bottom ends below the gripping area between the pickup wheels. So positioned and arranged, the skirts serve to assist in conveying crop stalks which extend below the gripping area between the heels onto the receiving platform, and also to keep the throat conveying area between each pair of gripping wheels free of crop products and debris. An upstanding stripping segment of the aforesaid lower baffle plate extending upwardly under each of the gripping wheels serves as a stripping device to remove material from the brushes as they sweep behind and under each pair of wheels, the stripped material dropping onto the receiving platform.

These and other objects and advantages of my invention will become readily apparent as the following description is read in conjunction with accompanying drawings wherein like reference numerals have been used to designate like elements throughout the several views.

DESCRIPTION OF THE PREFERRED EMBODIMENT

Figure 1:
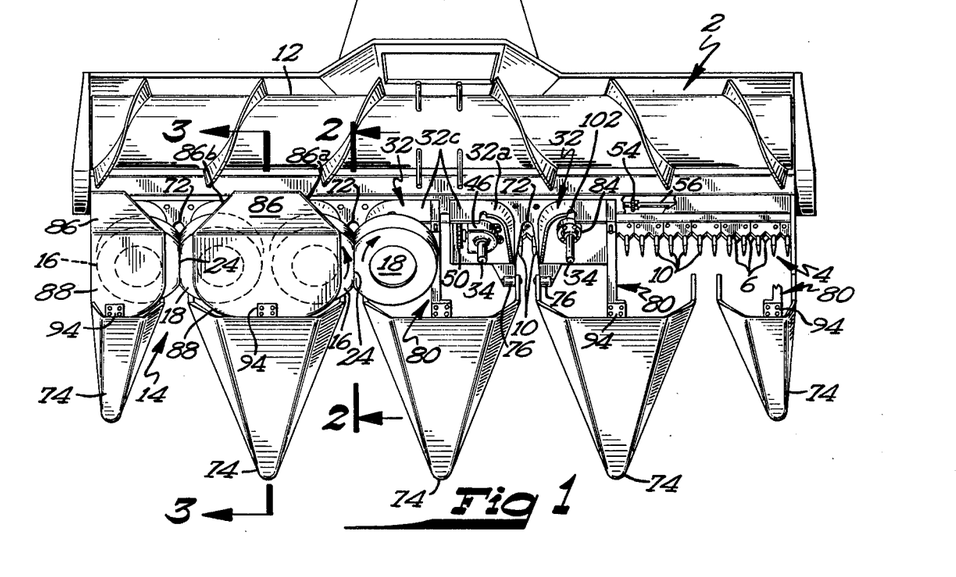
FIG. 1 is a top, plan view of the front end of a harvesting machine, with parts thereof broken away, showing the improved harvesting attachments of this invention mounted thereon.
Figure 2:
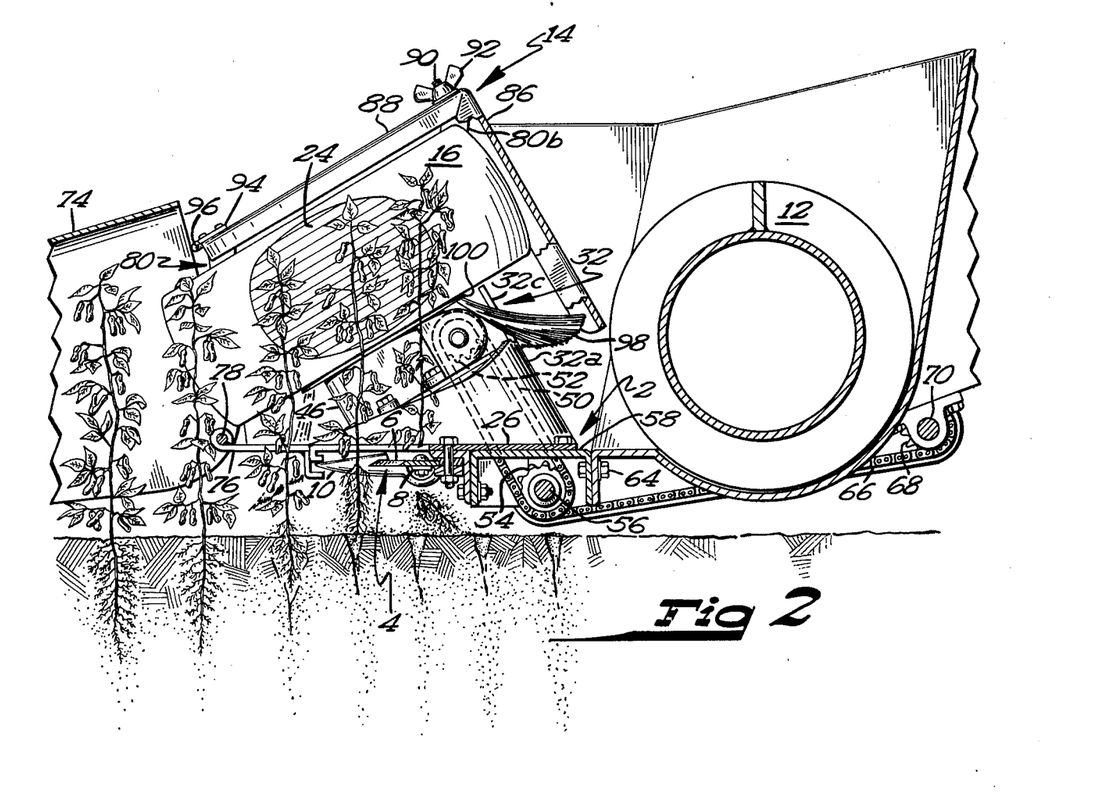
FIG. 2 is a vertical section view, on an enlarged scale, of one of the harvesting attachments taken along lines 2—2 of FIG. 1.
Figure 6:
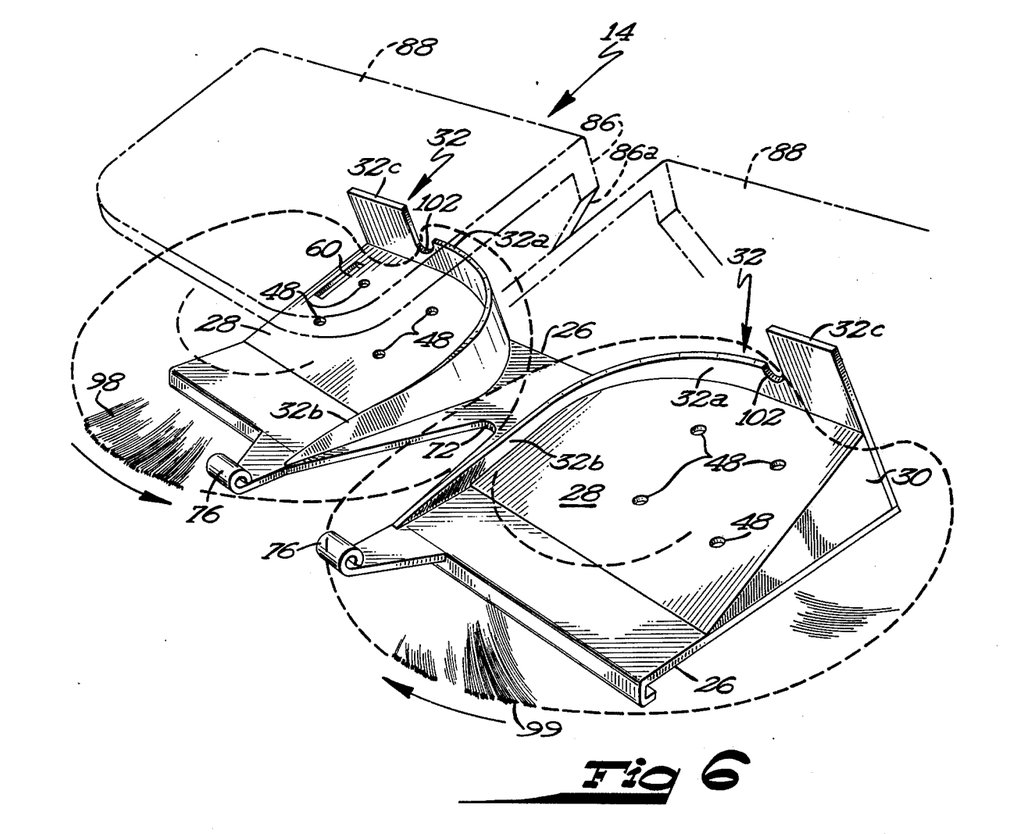
FIG. 6 is a top, perspective view of the base plate arrangement for supporting a pair of gripping wheels, and showing the circular path of pickup skirts attached to the gripping wheels, this view being taken along lines 6—6 of FIG. 3.

Referring now to the drawings, I have shown in FIGS. 1, 2 and 6 the preferred embodiment of my improved harvesting apparatus mounted on the front end of a combine. It is to be understood that the harvesting attachment of this invention could be mounted on any type of harvesting machine, either self-propelled or of the pull type. The drawings illustrate the front end of a self-propelled combine of the type on which my harvesting attachment is expected to find widespread application. Such combines are of the well known type having a receiving apron or platform 2 on which harvested plant stalks are received after being cut by a blade mounted on the front end of the platform. Such a cutting blade may be of the rotary or reciprocal sickle type, so long as the cutting zone of the blade is disposed with respect to the gripping members of my harvesting attachment in the manner hereinafter described. The drawings illustrate a laterally reciprocal sickle or cutting blade 4. Cutting blade 4 is of conventional design, and includes a plurality of teeth 6 attached to a cutting bar 8, teeth 6 being protected by forwardly projecting guards 10 in a known manner. The entire cutting blade assembly 4 is laterally reciprocal on the front end of platform 2 to achieve a cutting action by a reciprocating mechanism (not shown) of the type conventionally employed on combines. An auger 12 of the type conventionally utilized to move harvested plant stalks transversely of a combine to a separating attachment is shown positioned at the forward end of platform 2.

Figure 4:
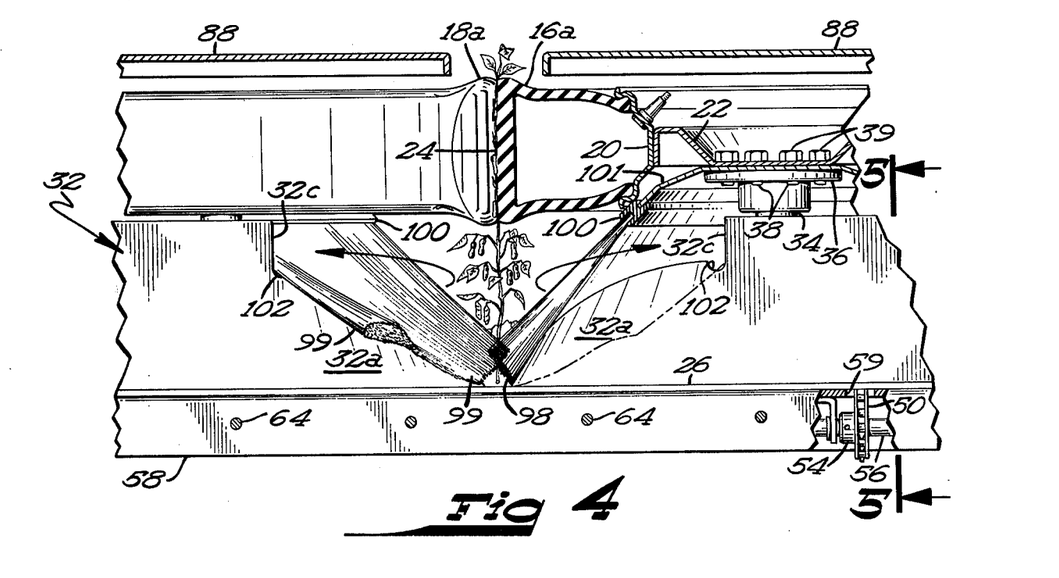
FIG. 4 is a rear elevation view, partially in section, of the harvesting attachment, taken along lines 4—4 of FIG. 3.

A plurality of my improved harvesting attachments generally indicated by reference numeral 14 are shown mounted on the front end of combine platform 2. Each of the attachments 14 is comprised of a pair of rotary gripping members 16 and 18, which preferably take the form of low profile gripping wheels. These wheels are of the type shown having a height dimension substantially less than their diameters, and thereby being capable of reaching down close to the ground when mounted in the forwardly inclined positions shown. This ensures that the wheels will be able to grip and pick up low crops, such as, soybeans, having short, low lying stalks and vines. Wheels 16, 18 have yieldable peripheral surfaces which are disposed in frictional contact and pressure engagement with each other. To this end, the wheels are preferably of the pneumatic type having tire casings 16a and 18a as shown in FIG. 4 mounted on rims 20 and having an inner hub 22. Tires 16a and 18a are inflated to a predetermined pressure such that they will yield under pressure contact in the manner shown in FIGS. 1 and 4 to define a contact and gripping areas 24 for picking up crops, clearly shown in FIG. 2.

My harvesting attachment is preferably provided in the form of unitary modules, each having a pair of rotary gripping wheels 16, 18, and being adapted for quick and easy mounting on the crop receiving end of a harvesting machine. The base plate mounting arrangement for accomplishing this may best be understood by reference to FIGS. 2, 5 and 6. Each attachment unit includes a bottom plate 26 on which rotary support means are mounted at laterally spaced locations to support gripping wheels 16, 18 at inclined positions as shown. This is accomplished by the use of inclined base plates 28 supported between upright end plates 30 and baffle plates 32. For reasons hereinafter explained, baffle plates 32 preferably take the irregular form shown including a rear, upright baffle segment 32a and a forwardly extending segment 32b. Base plate 28 is supported as shown between baffle plate segments 32a, 32b and triangular shaped end plates 30. Rear baffle plate segments 32a extend generally laterally across base plate 28 and project upwardly from adjacent the rear end thereof, preferably in the inclined position shown. Each of the baffle members or plate segments 32a includes an upstanding, raised segment 32c projecting above the adjacent lower portions thereof, for reasons hereinafter explained.

Figure 5:
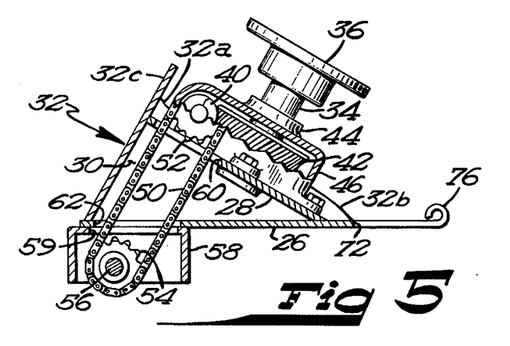
FIG. 5 is a fragmentary, vertical section view of the mounting plate and drive arrangement for one of the rotary gripping wheels, taken along lines 5—5 of FIG. 4.

Base plate means 26, 28 support at laterally spaced locations thereon a pair of rotary support means in the form of drive axles 34 and attached hub plate assemblies 36 on which rotary gripping wheels 16, 18 are supported. As is shown in FIG. 4, hubs 22 of gripping wheels 16, 18 are affixed to hub plate assemblies 36 by stud bolts 38 and nuts 39. One of the wheels of each set of pickup wheels 16, 18 is a driving wheel with which drive means is associated. Such drive means may take various forms. The primary consideration with respect to the desired low profile, and entanglement-free mounting and drive arrangement for my rotary pickup wheels is that the drive means be compact and mountable below the gripping wheels 16, 18. I have found that a worm gear drive is particularly suitable for these purposes. Worm gear 40, as shown in FIG. 5, meshes with the teeth of a ring gear 42 having an output shaft which serves as wheel axle 34. Axle 34 is rotatably supported in thrust bearings 44 mounted on the housing 46 within which worm gear 40 and ring gear 42 are contained. Gear housing 46 is bolted to inclined base plate 28, bolt holes 48 shown in FIG. 6 being provided for this purpose. With gripping wheels 16, 18 so mounted on inclined base plate 28, they will be supported in a forwardly and downwardly inclined position with respect to the crop receiving side of harvesting attachments 14 in the manner shown in FIGS. 2 and 3. Worm gear 40 and ring gear 42 constitute drive means forming a part of a power transmitting means extending to each of the drive wheels 16 from a power source on a harvesting machine. The power transmitting means advantageously takes the form of a chain 50 extending around a sprocket 52 on the end of the shaft of worm gear 40 from a driving sprocket 54 mounted on a low level drive shaft 56. Bearings in the opposite ends of a spacer channel 58 rotatably support drive shaft 56 below bottom plate 26 adjacent the rear end thereof. Plate 26 is affixed to the top of channel 58 by bolts or other appropriate fastening means. As may be noted most clearly by reference to FIGS. 5 and 6, power transmitting chain 50 extends through aligned slots 60 and 62 provided in base plate 28 and bottom plate 26 for that purpose. Slots 60 and 62 comprise passage means permitting power transmitting apparatus to extend from beneath base plate 26 upwardly to drive wheels 16 from beneath these wheels.

Figure 3:
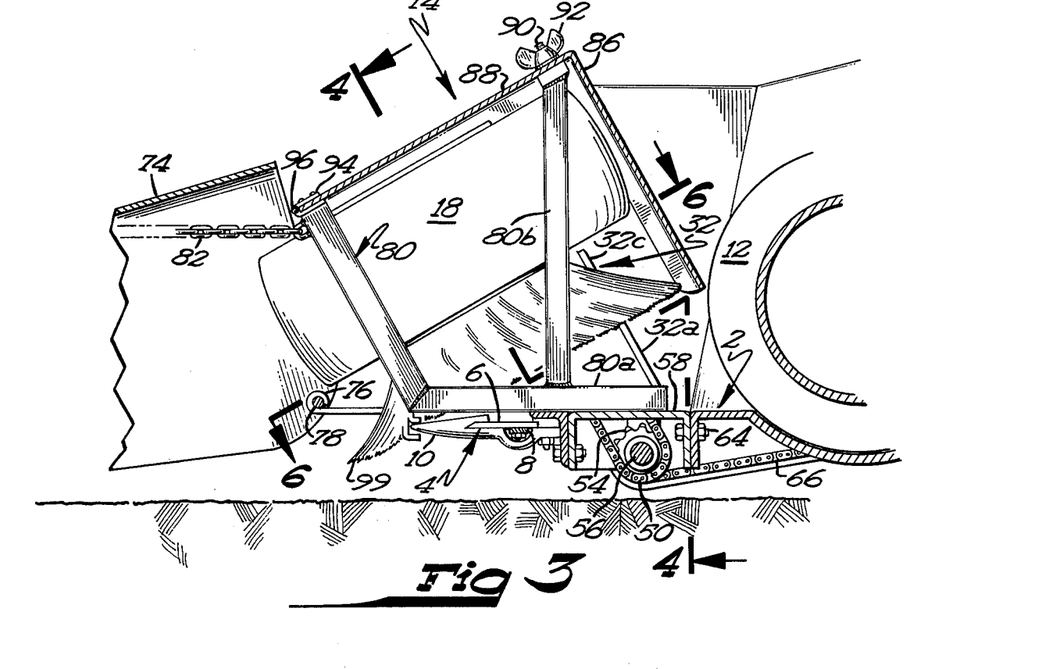
FIG. 3 is a vertical section view of one of the harvesting attachments taken along lines 3—3 of FIG. 1.

FIGS. 2 and 3 illustrate most clearly the manner in which one or more of my improved, unitary harvesting attachments 14 may be mounted on the front end of a combine receiving platform 2. This is preferably accomplished by securing spacer channel 58 to the front end of the combine platform 2 by bolts 64. The combine cutting plate assembly is removed and bolted to the front end of channel 58, whereby channel 58 serves as a spacer betwen cutting blade 4 and the front end of the combine platform 2. Spacer channel 58 is positioned so that it is even with the top of receiving platform 2, thereby forming a forward extension of this platform. With spacer channel 58 so mounted, drive shaft 56 will be rotatably supported transversely of platform 2 adjacent the forward end thereof, at a level below rotary gripping wheels 16, 18. Preferably, as shown, low level drive shaft 56 will be positioned below the forward end of the platform means, and power transmitting chain 50 will extend upwardly and forwardly therefrom to wheel drive sprocket 52. This arragement ensures that crop material being conveyed rearwardly onto platform 2 by gripping wheels 16, 18 will not be caught on auxiliary drive shaft 56. Power to drive shaft 56 may obviously be provided in various ways. A power input chain 56 has proven to be effective and suitable for this purpose, chain 66 extending from a drive sprocket 68 on a power input shaft 70 around a second sprocket (not shown) on auxiliary drive shaft 56. Power input shaft 70 is a transversely extending shaft normally found on the forward end of combines for providing power to crop handling apparatus, such as rotary, auger conveyor 12.

By virtue of the rotary gripping wheel mounting and drive arrangement described above, the rotary support means 34, 36 as well as the power transmitting and drive means for each pair of gripping wheels will be supported entirely below the gripping wheels 16, 18. There will thus be no drive or support components for the rotary gripping wheels 16, 18 above the wheels on which crop material or weeds of any kind could become entangled. This provides an extremely low profile, rotary gripping wheel pickup apparatus, especially suitable for such low lying vine crops as soybeans where interlocking vines and crop segments are likely to become caught on the pickup members, or their support or drive apparatus. This problem is further minimized by having power transmitting chain 50 as well as the wheel drive means 40, 42 positioned in front of the upright, laterally extending rear segment 32a of baffle plate 32. Baffle plate segments 32a project forwardly and upwardly from adjacent the front end of crop receiving platform 2 in a forwardly inclined position and terminate at their upper ends in close proximity to the underside of rotary gripping wheels 16, 18. Preferably, the upper ends of baffle plate segments 32a are positioned forwardly of the rear extremity of gripping wheels 16, 18. With the power transmitting chain 50 and the other wheel drive components 40, 42 disposed forwardly of baffle plate segments 32a, under the gripping wheels 16, 18, there will be little likelihood of crop or trash components being caught on any portion of this power transmitting and drive mechanism. This advantage is of course enhanced by having auxiliary drive shaft 56 positioned below the forward end of receiving platform 2, where it will be shielded from incoming crop components. Both of the slots 60 and 62 to which power transmitting chain 50 extends upwardly and forwardly are located forwardly of rear baffle plate segment 32a towards the crop receiving side of harvesting attachments 14 in order to ensure that the drive means and power transmitting chain 50 will be positioned forwardly of and under inclined baffle plate segments 32a for protection from crop segments.

A plurality of my harvesting attachments 14 may be mounted across the front end of the receiving platform 2 of a combine for harvesting a number of rows of crops at the same time. This is simply accomplished by attaching the bottom plates 26 of each unitary attachment 14 at laterally spaced locations across a combine receiving platform, utilizing spacer channels 58, so as to ensure that the contact and gripping area 24 between each pair of gripping wheels 16, 18 will be aligned with a row of crops to be harvested. FIG. 1 illustrates a plurality of my harvesting attachments 14 mounted in such a manner on the front end of a combine having a receiving platform 2. FIGS. 1 and 6 illustrate a V-shaped receiving throat 72 formed in the front end of each of the attachment bottom plates 26 for the rearward passage of crop stalks to cutting blade 4. A plurality of cone-shaped guide members 74 mounted in laterally spaced relation as shown in FIG. 1 serve to guide crop stalks into the throat receiving area 72 between each pair of rotary gripping wheels 16, 18. Conical guide members 74 are supported at their bottom ends on forwardly extending, curled extension tips 76 of base plates 26 by means of mounting pins 78 extending therethrough. At their upper ends, conical guide members 74 are attached to support arms 80, each of which has a horizontal, bottom segment 80a affixed to one end of one of the bottom plates 26 as illustrated in FIGS. 1 and 3. Each of the conical guide members 74 is secured to the upper end of one of the support arms 80 by chain 82 extending from its forward end.

In order to utilize a plurality of my harvesting attachments 14 with a number of pairs of grippings wheels 16, 18 mounted as shown in FIG. 1 on the front end of a combine, a plurality of power transmitting chains 50 are positioned on sprockets 54 at laterally spaced locations along the length of auxiliary drive shaft 56. One of the chains 50 extends from a drive sprocket 54 to a drive wheel 16 of each pair of gripping wheels to drive its worm gear 40. Each of the driven gripping wheels 18 is mounted on a drive axle 34 rotatably supported in a bearing block 84 bolted to the top of one of the inclined base plates 28 in the same manner as is worm gear housing 46. One of the bearing blocks 84 is illustrated in FIG. 1. Each of the drive gear assemblies 40, 42 and power transmitting chains 50 are mounted below rotary gripping wheels 16, 18 and forwardly of baffle plate segments 32a in the same manner desdribed above in order to avoid any interference with crop segments being conveyed rearwardly between rotary gripping wheels 16, 18 onto the front end of receiving platform 2. Although auxiliary drive shaft 56 extends substantially all of the way across the front end of platform 2 when utilizing a plurality of my attachments 14 in the manner illustrated in FIG. 1, its support position rearwardly of cutting plate 4, below the forward end of receiving platform 2 ensures that it will not interfere with the rearward movement of crop stalks through gripping wheels 16, 18 and their lateral conveyance by rotary auger 12.

With each of the unitary, harvesting attachments 14 mounted on the crop receiving end of a harvesting machine in the manner illustrated in FIGS. 2 and 3, each pair of rotary gripping wheels 16, 18 will be supported in the forwardly and downwardly inclined positions shown with the forward ends of these wheels being lowermost and close to the ground. Wheels 16 and 18 will rotate in opposite directions so as to grip the stalks of plants between them at the forward end of their gripping area 24. As is illustrated in FIG. 2, the angular orientation of gripping wheels 12 and 13, and their direction of rotation, will cause them to exert an upward and rearward pulling force on stalks to convey them over cutting blade 4 for cutting thereby. As wheels 16 and 18 rotate, they will convey severed stalks rearwardly onto the front end of receiving platform 2. In order to achieve the desired lifting effect of plant stalks, such as those of low lying soybean stalks as illustrated in FIG. 2, prior to cutting of the stalks by sickle 4, gripping wheels 16, 18 are so mounted with respect to cutting blade 4 that their gripping and contact areas 24 extend from a point in front of cutting blade 4 rearwardly to a rear, terminal point located at least as far rearwardly as the rear end of cutting blade 4 in overlying relation thereto. In operation, the rotational speed of each set of gripping wheels in such that they will impart a predetermined vertical lift to a plant stalk and will hold a lifted stalk within gripping areas 24 as the stalk reaches the cutting blade or sickle 4 of the combine and severs it from its roots. With the angle of inclination of the gripping wheel set to achieve a lift equal to the elevation of the combine cutting blade above the ground, each plant stalk will be severed substantially at its base where it joins its roots as it is held at the rear of gripping area 24. Thus, my harvesting attachment ensures that low lying crops, such as the bean pods on soybean vines, will be gathered and harvested. The continued rotation of gripping wheel 16, 18, after severance of each stalk from its root system, will operate to throw each severed stalk onto receiving platform 2 for lateral movement by rotary auger 12 to a sorting and separating device.

In order to avoid any undue interference of rotating gripping wheels 16, 18 with harvested crop stalks and vines being moved laterally on platform 2 by means of rotary conveyor 12, I provide a guide baffle 86 which extends downwardly behind each pair of rotary gripping wheels 16, 18 in closely spaced relation thereto. Each of the upper guide baffles 86 is preferably part of an overhead shield assembly which includes a cover plate 88 extending over the top of the gripping wheels in the manner illustrated in FIGS. 1 and 3. Top cover plates 88 preferably extend forwardly over the gripping wheels in closely spaced relation to the top surface thereof from a point of angular connection with rear guide baffles 86, and form a unitary shield assembly therewith. With top cover plates 88 preferably extending parallel to the top, planar surface of gripping wheels 16, 18, rear guide baffles 86 will extend downwardly in inclined positions substantially at right angles to cover plates 88. Each of the overhead shield assemblies 86, 88 is supported on the upper end of an upright post member 80b forming a part of support arm assemblies 80 and affixed at their lower ends to support arm base members 80a. A threaded fastening bolt or stud 90 affixed to the top of support post 80b extends upwardly through an aligned aperture in the rear end of overhead cover plate 88 and is secured thereto by a wing nut 92. In order to permit access to the gripping wheels and their drive assemblies, overhead shield assembly 86, 88 is hingedly mounted at its forward end to the top of support arm 80, as illustrated in FIG. 3. For this purpose, a hinge plate 94 attached to the forward end of cover plate 88 is secured to a hinge pin 96 affixed to a mating hinge plate on the top end of support arm 80. By removing wing nut 92, the overhead shield assembly 86, 88 can be swung upwardly and forwardly in the manner indicated by the directional arrow in FIG. 2 to expose gripping wheels 16, 18. With overhead shield assembly 86, 88 in its downward, closed position, cover plate 88 ensures that no crop or weed material will be caught and carried around on the top of rotating wheels 16, 18.

Downwardly projecting, rear guide baffle 86 terminates at its lower end below gripping wheels 16, 18, forwardly of auger conveyor 12. Normally, the bottom end of guide baffle 86 will be close to auger 12. This guide baffle arrangement ensures that crops harvested and being conveyed laterally by auger 12 with respect to platform 2 will not be caught by rotating wheels 16, 18 and carried around by them and dropped on the ground. This would not only result in undue crop loss, but also would cause such an accumulation of crop vines and stalks on rotating wheels 16, 18 as to interfere with their continued gripping, and rearward lifting of crop stalks as the machine on which they are mounted moves forwardly.

Preferably, as noted above, lower baffle plate segment 32a projects forwardly and upwardly from the front end of platform 2 in such a manner as to terminate at its upper end under gripping wheels 16, 18 forwardly of the rear extremity thereof. Laterally extending baffle members 86 and 32a will thus be spaced apart along the length of the harvesting attachment and machine as illustrated in FIG. 3 so as to define therebetween a guide passage through which crop stalks carried around by the gripping wheels will fall for reception on platform 2. This function is enhanced by having the bottom end of upper guide baffle 86 terminate along its bottom edge between the top and bottom extremities of lower guide baffle member 32a. Crop or weed segments which might otherwise be carried around by gripping wheels 16, 18 will be caught on the downwardly extending guide baffle 86 and dropped down between this guide baffle and lower baffle member 32a. To this end, the opposed side edges 86a and 86b of upper guide baffle 86 incline downwardly and inwardly as illustrated in FIGS. 1 and 6 to assist in deflecting crop materials downwardly onto platform 2.

Although gripping wheels 16 and 18 have been found to pick up crop stalks very well and convey them onto platform 2, I have found that by the addition of downwardly depending brush skirts 98 and 99 to the underside of gripping wheels 16, 18, I can improve the operation of my harvesting attachment. The construction and operation of brush skirts 98 and 99 may be best understood by reference to FIGS. 3, 4 and 6. Each of these skirts is attached at its upper end to the rim 20 of wheels 16 and 18 adjacent the tire bead on the underside of the wheel. The individual bristles of the brush type skirts are affixed to the bead area of the tire rim indicated by reference numeral 100 in FIG. 4. Skirts 98 and 99 flare outwardly and downwardly from the underside of the gripping wheels 16 and 18 below the wheel gripping area 24 as clearly shown in FIG. 4. At their bottom ends, brush skirts 98 and 99 overlap and interleave below wheel gripping area 24. The arcuate path of the outer, bottom ends of brush skirts 98 and 99 generally conforms to the outer, circular periphery of tires 16a, 18a and is indicated in phantom lines in FIG. 6. As brushes 98 and 99 rotate with gripping wheels 16, 18, they engage crop material supported below the nip or gripping area 24 between the wheels and assist in conveying such crop material rearwardly onto receiving platform 2. As is indicated in FIG. 6, the brushes will first engage each other and crop material therebetween at the forward end of the receiving throat 72 formed in bottom plate 26. As the brushes move through the throat or crop conveying area between the gripping wheels they will asist in moving crop material rearwardly until they part, by their natural rotation in the zone immediately to the rear of the wheel gripping area 24. This rear, crop conveying zone is defined between the adjacent, laterally spaced portions of the two baffle plate members 32 of a single attachment 14 as illustrated in FIG. 6. It is obviously important that this entire crop conveying throat and zone area between the gripping wheels, and between adjacent baffle plates 32 as illustrated in FIG. 6 be kept free of debris so as to provide for the unimpeded rear conveyance of crop stalks onto receiving platform 2. Brushes 98 and 99 assure that this is accomplished by sweeping debris from this crop conveying zone as they rotate therethrough with wheels 16 and 18. Upstanding, raised segments 32c of rear baffle plate segments 32a are disposed in the circular path of brushes 98 and 99 adjacent the rear periphery of gripping wheels 16 and 18. As is indicated in FIGS. 4 and 6, upstanding baffle plate segments 32c project above the adjacent, lower edge of upstanding, rear baffle plate segments 32a and serve as stripping shoulders to remove crop material from brush skirts 98 and 99 and deflect it onto receiving platform 2. A downwardly extending notch 102 is formed at the junction point of baffle plate segments 32a and 32c. As is indicated by the dotted line path of the brush skirts in FIG. 6, these notches serve to permit the smooth movement of the bottom end of the brushes forwardly, over the forward face of baffle segment 32c. Since the bottom ends of brush skirts 98 and 99 extend freely over the lower portions 32a and 32b of baffles 32, these brushes rotate freely except at the stripper area where they contact the edges of upstanding baffle segments 32c. Baffle segments 32c, by deflecting the brush skirts inwardly or forwardly with respect to receiving platform 2, function to keep the brushes from rotating through the working area immediately behind laterally extending baffle plate segments 32a and guide baffles 86 where they would interfere with the free movement of crop material in the zone between spaced apart baffle members 32a and 86. Although various attachment means may be utilized for securing brush skirts 98 and 99 to the underside of gripping wheels 16 and 18, I prefer to utilize a special ring adaptor plate 101 affixed to the underside of the wheel hubs as shown in FIG. 4 and supporting in its bottom, outer periphery a slotted, flexible ring 100. The upper ends of the bristles of brush skirts 98 and 99 are secured within the slot of flexible rubber ring 100 by the inward, flexing action thereof.

It is to be noted that the inner end of the throat or notched portion 72 of bottom plate 26 of the attachment units 14 terminates adjacent the rear end of cutting blade 4. This ensures that incoming crop stalks will move freely, rearwardly by the gripping action of oppositely rotating wheels 16, 18 until they are severed from their roots by cutting blade 4.

It is understood that various types of drive means, other than the chain 50 and worm gear drive 40, 42 illustrates herein may be utilized to transmit power from auxiliary drive shaft 56 to the drive wheel of each pair of gripping wheels 16, 18. The primary consideration is that both the drive shaft 56 and the power transmitting means extending therefrom to the axle of a drive wheel be located so as to be shielded from moving crop material. For example, meshing bevel gears could be utilized in place of the worm and ring gear arrangement shown for supplying rotary power to a wheel axle. Also, it is conceivable that bevel gears could be mounted directly on drive shaft 56 to drive mating bevel gears mounted directly on the gripping wheel axles, or extensions thereof.

I anticipate that various other changes may be made in the size, shape, construction and arrangement of the various components of my harvesting attachment disclosed herein, without departing from the spirit and scope of my invention as defined by the following claims.

What is claimed is:

1. A harvesting attachment on the crop pickup end of a harvesting machine supported on ground engaging wheel means, comprising:

crop receiving platform means;

cutting blade means mounted at the forward end of said platform means and movable in a direction relative to the forward, harvesting direction of movement of the machine to sever crop stalks;

at least one pair of rotary gripping members of generally circular shape rotatably supported on axles on the forward end of said platform means, said gripping members being supported in an angularly inclined position with respect to the ground with the forward ends of said gripping members being lowermost, and said gripping members having yieldable, peripheral surfaces in pressure contact with each other along a contact and gripping area extending from a point forwardly of the cutting zone of said cutting blade means rearwardly to a point at least as far rearwardly as the rear end of said cutting zone in overlying relation thereto;

a low level drive shaft for said rotary gripping members extending transversely of said platform means adjacent the forward end thereof at a level below said pair of gripping members;

power input means for rotating said drive shaft; and power transmitting means extending upwardly from said drive shaft to the axle of one of said gripping members thereby rotating together in opposite directions so as to grip the stalks of plants therebetween at the forward end of said gripping area and exert an upward and rearward pulling force on stalks and hold them for cutting from their roots by said cutting blade means prior to conveying the stalks onto said platform means; and baffle plate means extending upwardly from adjacent the front end of said platform means to a position in close proximity to the underside of said rotary gripping members, and said power transmitting means being located forwardly of said baffle plate means, whereby said power transmitting means is shielded by said baffle plate means from crop segments and trash being carried rearwardly by said rotary gripping members.

2. Harvesting apparatus as defined in claim 1 wherein:

said drive shaft is positioned below the forward end of said platform means.

3. Harvesting apparatus as defined in claim 1 wherein:

said drive shaft is positioned behind said cutting blade means at substantially the same level as said cutting blade means.

4. Harvesting apparatus as defined in claim 3 wherein:

said cutting blade means is in the form of an elongated sickle laterally reciprocal in a direction transverse to the direction of movement of said machine, and said drive shaft is positioned below said platform means.

5. Harvesting apparatus as defined in claim 1 wherein:

said baffle plate means has a segment thereof projecting forwardly and upwardly from the forward end of said platform means in a forwardly inclined position with respect thereto and terminating at its upper end under said rotary gripping members forwardly of the rear extremity thereof, said power transmitting means being located in its entirety forwardly of said inclined baffle segment.

6. Harvesting apparatus as defined in claim 1 wherein:

a plurality of pairs of said rotary gripping members in the form of yieldable wheels are rotatably supported on axles across the front end of said platform means at laterally spaced locations, the gripping area between each pair of wheels being positioned to align with a row of crops to be harvested; and a plurality of power transmitting means drivingly connected between said drive shaft and one of said rotary gripping members of each pair of rotary gripping members for imparting rotary driving movement thereto, said plurality of power transmitting means being positioned at laterally spaced locations transversely of said platform means for connection to said drive shaft at laterally spaced locations thereon, and each of said power transmitting means being positioned in its entirety below said rotary gripping wheels, there being no rotary drive components above said rotary wheels.

7. Harvesting apparatus as defined in claim 1 wherein:

said rotary gripping members are in the form of yieldable wheels mounted on the upper ends of their respective axles; and a cover plate positioned over each of said gripping wheels in closely spaced, substantially parallel relation to the top surface of each of said gripping wheels.

8. A low profile harvesting attachment for wheel propelled harvesting machines comprising:

base plate means adapted to be mounted on the crop receiving end of a harvesting machine;

a pair of rotary support means mounted on said base plate means at laterally spaced locations thereon;

a pair of stalk-gripping wheels rotatably supported on said support means and having yieldable peripheral surfaces in pressure contact with each other along a common plane defining a contact and gripping area between said wheels, said rotary support means being positioned entirely below said wheels and constructed and arranged to support said wheels in a forwardly and downwardly inclined position with respect to the crop receiving side of said attachment; and drive means drivingly associated with one of said wheels for imparting rotary movement thereto, whereby said wheels will rotate together in opposite directions, said drive means being supported on said base plate means and positined entirely at a level below said wheels; and baffle plate means having at least a segment thereof extending laterally across said base plate means and projecting upwardly from adjacent the rear end thereof and terminating beneath said one gripping wheel having drive means associated therewith, at a location forwardly of the rear extremity of said one drive wheel, said drive means being supported in its entirety forwardly of said baffle plate segment.

9. A harvesting attachment as defined in claim 8 wherein:

said base plate means includes passage means for the extension of power transmitting means to said wheel drive means from beneath said base plate means.

10. A harvesting attachment as defined in claim 8 wherein:

said baffle plate segment is inclined forwardly and upwardly towards the receiving end of said base plate means from its point of attachment to said base plate means.

11. A harvesting attachment as defined in claim 9, and further including:

baffle plate means having at least a segment thereof extending generally laterally across said base plate means and projecting upwardly from adjacent the rear end thereof, and terminating beneath said one gripping wheel at a location forwardly of the rear extremity thereof, said drive means and said passage means being located forwardly of said baffle plate segment towards the crop receiving side of said attachment.

12. A harvesting attachment as defined in claim 8, wherein:

said base plate means includes a single bottom plate on which said rotary support means for both of said gripping wheels are mounted in laterally spaced relation; and separate baffle plate means for the other, driven one of said gripping wheels having an upwardly projecting segment thereof extending generally laterally across said base plate means at a laterally spaced location from said upwardly projecting segment of said baffle plate means associated with said one, drive wheel to provide a crop conveying space therebetween, and said upwardly projecting segment of said separate baffle plate means terminating beneath said driven wheel at a location forwardly of the rear extremity thereof.

13. A harvesting attachment on the crop pickup end of a harvesting machine supported on ground engaging wheel means, comprising:

crop receiving platform means;

cutting blade means mounted at the forward end of said platform means and movable to sever crop stalks;

at least one pair of rotary gripping members of generally circular shape rotatably supported on axles on the forward end of said platform means, said gripping members being supported in an angularly inclined position with respect to the ground with the forward ends of said gripping members being lowermost, and said gripping members having yieldable, peripheral surfaces in pressure contact with each other along a contact and gripping area extending from a point forwardly of the cutting zone of said cutting blade means rearwardly to a point at least as far rearwardly as the rear end of said cutting zone in overlying relation thereto;

drive means for imparting rotary movement to a driving one of said gripping members, said gripping members thereby rotating together in opposite directions so as to grip the stalks of plants therebetween at the forward end of said gripping area and exert an upward and rearward pulling force on stalks and hold them for cutting from their roots by said cutting blade means prior to conveying the stalks onto said platform means;

conveyor means extending transversely of said platform means for moving harvested plant stalks received on said platform laterally with respect thereto; and a guide baffle extending downwardly behind said rotary gripping members in closely spaced relation thereto and terminating below said gripping members, said guide baffle being oriented generally transversely of said platform means in blocking relation to the rear face of said rotary gripping members, whereby said guide baffle prevents crop product being moved laterally of said platform from being caught on said rotary gripping members and carried around by them.

14. Harvesting apparatus as defined in claim 13 wherein:

a second, lower guide baffle extends upwardly from adjacent the front end of said platform means at a forwardly spaced loaction with respect to said first guide baffle and terminates below said rotary gripping members, said first and second guide baffles defining therebetween a guide passage through which crop stalks carried around by said gripping members will fall for reception on said receiving platform.

15. Harvesting apparatus as defined in claim 14 wherein:

said first guide baffle terminates along its bottom edge portion between the top and bottom extremities of said second, lower guide baffle.

16. Harvesting apparatus as defined in claim 14 wherein:

said second, lower guide baffle projects forwardly and upwardly from the forward end of said platform means in a forwardly inclined position with respect thereto and terminates at its upper end under said rotary gripping members forwardly of the rear extremity thereof.

17. Harvesting apparatus as defined in claim 14 wherein:

a low level drive shaft for said rotary gripping members extends transversely of said platform means adjacent the forward end thereof at a level below said pair of gripping members; and power transmitting means between said drive shaft and said driving one of said rotary gripping members for imparting rotary, drive movement thereto, said power transmitting means being located in its entirety forwardly of said second, lower guide baffle.

18. Harvesting apparatus as defined in claim 13 wherein:

said rotary gripping members are in the form of yieldable wheels mounted on the upper ends of their respective axles; and a cover plate positioned across the top of said gripping wheels in closely spaced, parallel relation to the top surface thereof, said cover plate extending forwardly over said gripping wheels from a point of angular connection ot said guide baffle and forming a unitary shield assembly therewith.

19. Apparatus as defined in claim 18 wherein:

said shield assembly is pivotally supported for swinging movement to an open position uncovering said gripping wheels to permit access thereto, said wheels having a height dimension in a direction along their axles which is substantially less than the diameter of said wheels.

20. Harvesting apparatus as defined in claim 14 wherein:

a flexible, stalk conveying skirt is affixed to the lower peripheral surface of each of said rotary gripping members for rotation therewith, said skirts flaring outwardly from top to bottom and overlapping at their bottom ends below said gripping area to assist in carrying crop stalks suspended below the gripping area of said wheels onto said platform means; and an elevated segment on said second, lower guide baffle disposed adjacent the rear periphery of said gripping members and serving as a stripping shoulder to strip crop material from said skirts, which might otherwise be carried around therewith as said skirts rotate with said gripping members.

21. A harvesting attachment on the crop pickup end of a harvesting machine supported on ground engaging wheel means, comprising:

crop receiving platform means;

cutting blade means mounted at the forward end of said platform means and movable to sever crop stalks;

at least one pair of rotary gripping members of generally circular shape rotatably supported on the forward end of said platform means, said gripping members being supported in an angularly inclined position with respect to the ground with the forward ends of said gripping members being lowermost, and said gripping members having yieldable, peripheral surfaces in pressure contact with each other along a contact and gripping area extending from a point forwardly of the cutting zone of said cutting blade means rearwardly to a point at least far rearwardly as the rear end of said cutting zone in overlying relation thereto;

drive means for imparting rotary movement to a driving one of said gripping members, said gripping members thereby rotating together in opposite directions so as to grip the stalks of plants therebetween at the forward end of said gripping area and exert an upward and rearward pulling force on stalks and hold them for cutting from their roots by said cutting blade means prior to conveying the stalks onto said platform means;

a flexible, stalk conveying skirt affixed to the lower peripheral surface of each of said rotary gripping members for rotation therewith, said skirts overlapping and interleaving at their bottom ends below said gripping area of said gripping members, and said flexible skirts serving to assist in conveying crop material suspended below said gripping area onto said platform means and to keep the zone between said gripping wheels clear of any loose material or debris.

22. Harvesting apparatus as defined in claim 21 wherein:
a baffle member is positioned at a level below each of said rotary members adjacent the rear periphery thereof in the circular path of said flexible skirts, each of said baffle members extending upwardly from adjacent the front end of said platform means and serving to strip material from said flexible skirts as they rotate with said rotary members.

23. Harvesting apparatus as defined in claim 22 wherein:
each of said baffle members comprises an upstanding, raised segment projecting generally laterally of said platform means above an adjacent, lower edge portion of said baffle members said raised segments serving as stripping shoulders to remove material from said skirts and deflect it onto said platform.

24. Harvesting apparatus as defined in claim 23 wherein: said lower edge portion of each of said baffle members is notched downwardly where it joins said raised segments.

25. Harvesting apparatus as defined in claim 13 wherein: said guide baffle is disposed substantially in its entirety rearwardly of said rotary gripping members.

* * * * *